Oct. 22, 1929.                  J. A. YOUNG                    1,732,424
                           POWER DRIVEN SLUSH PUMP
                           Filed April 20, 1928         2 Sheets-Sheet 1
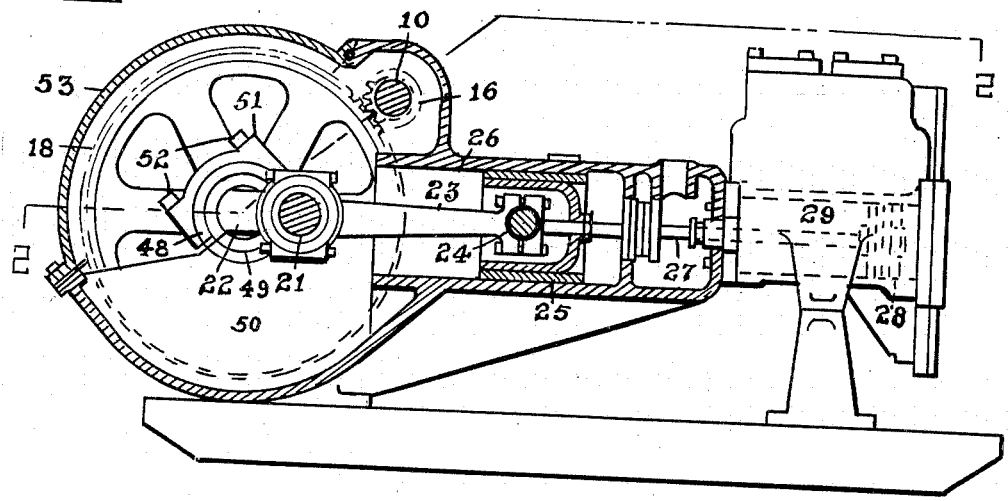
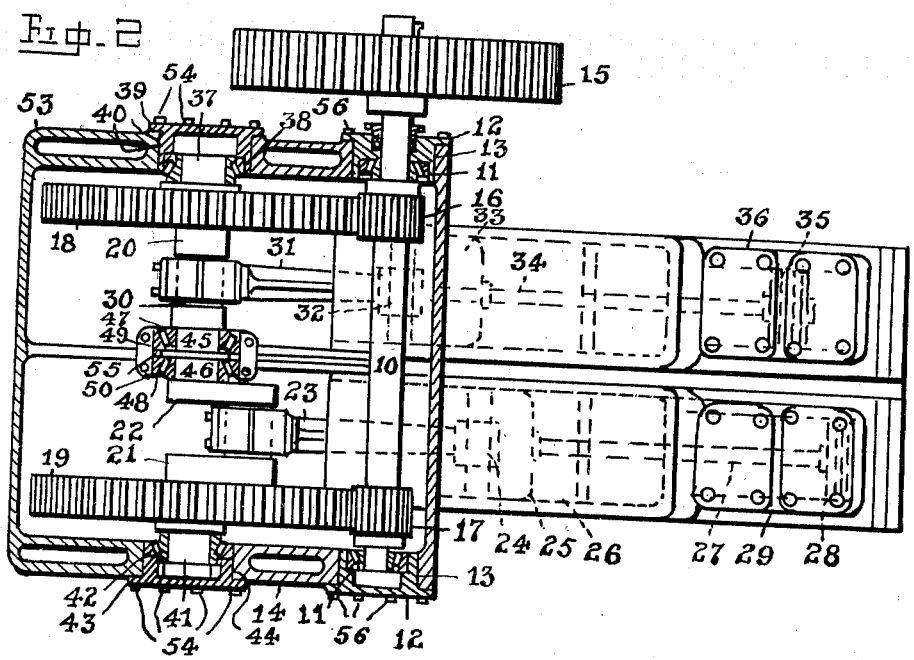
INVENTOR.
John A. Young
BY F. N. Barber
ATTORNEY.

Oct. 22, 1929.                J. A. YOUNG                1,732,424
                         POWER DRIVEN SLUSH PUMP
                         Filed April 20, 1928        2 Sheets-Sheet 2

INVENTOR.
John A. Young
BY G. N. Barker
ATTORNEY

Patented Oct. 22, 1929

1,732,424

UNITED STATES PATENT OFFICE

JOHN A. YOUNG, OF TORRANCE, CALIFORNIA, ASSIGNOR TO THE NATIONAL SUPPLY COMPANY, OF TOLEDO, OHIO, A CORPORATION OF OHIO

POWER-DRIVEN SLUSH PUMP

Application filed April 20, 1928. Serial No. 271,436.

My invention relates to pumps having a plurality of pump cylinders and pistons.

It is one object of this invention to provide a pump of the character just described whose pistons are driven by separate crank shafts actuated from a common source. Other objects relate to constructional details which permit the ready assembling of the elements of the pump.

Figure 3:
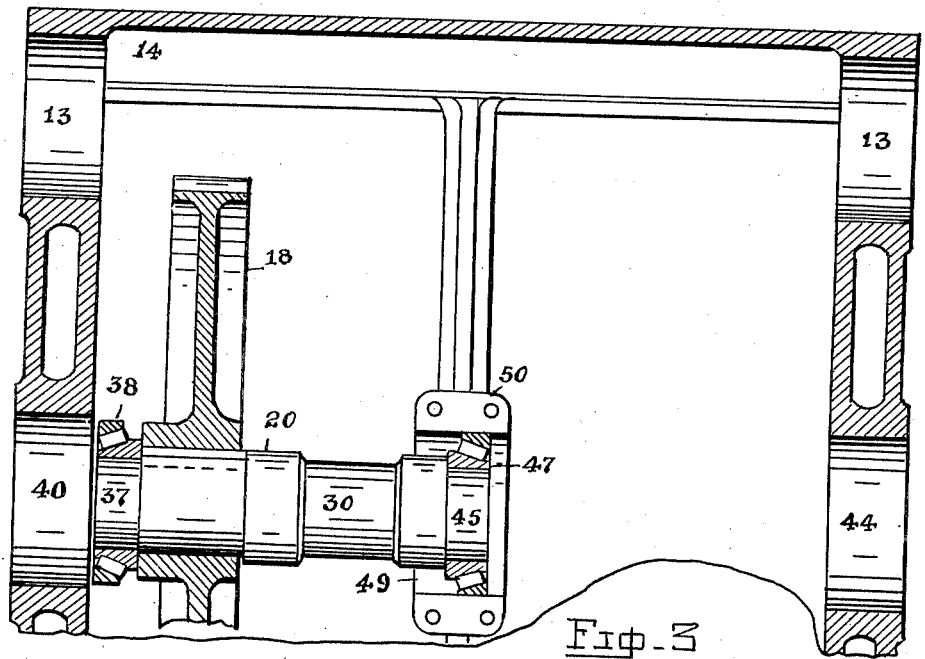

Referring to the accompanying drawing, Fig. 1 is a longitudinal vertical section of a pump embodying this invention, the right-hand end of the view being in side elevation; Fig. 2, a section on the line 2—2 on Fig. 1; Fig. 3, a sectional view showing the manner of getting the first crank shaft into the casing; and Fig. 4, a view like Fig. 3 but showing the manner of getting the second crank shaft into the casing, the two cranks being slightly to the left of their final positions which are shown in Fig. 2.

On the drawings, 10 designates a drive shaft mounted on roller bearings 11 held by the caps 12 secured in holes 13 in the sides of the casing 14. Externally of the casing the shaft 10 has a driving wheel, as the spur gear wheel 15, for example. Within the casing the shaft has near its ends and the sides of the casing the pinions 16 and 17 meshing respectively with the spur gears 18 and 19 on the respective crank shafts 20 and 21. The shaft 21 has the crank 22 connected by the pitman 23 to the pivot pin 24 in the cross-head 25 slidable in the guide 26. The cross-head 25 has attached thereto the piston rod 27 which is connected to the pump piston 28 reciprocable in the pump cylinder 29.

The crank shaft 20 has the crank 30 which operates the pitman 31 connected by pivot pin 32 to the cross-head 33. The cross-head 33 has attached thereto the piston rod 34 which is connected to the piston 35 reciprocable in the pump cylinder 36 contiguous with the cylinder 29 and parallel therewith.

The outer end 37 of the shaft 20 has the antifriction bearing 38 mounted in the cap 39 secured in the hole 40 in the side of the casing 14. The outer end 41 of the shaft 21 has the antifriction bearing 42 mounted in the cap 43 secured in the hole 44 in the opposite side of the casing 14, the two crank shafts being horizontally alined.

The inner ends 45 and 46 of the respective shafts 20 and 21 are opposite each other and provided with the antifriction bearings 47 and 48, which lie in the recess 49 in the upper end of the center bearing support 50. 51 is the cap for the bearing support. It rests on the upper portions of the antifriction bearings or rings 47 and 48 and is connected to the support 50 by the bolts 52 which preferably clamp the outer rings or members of the bearings between the cap 51 and the support 50.

The casing 14 has the removable cover 53 which when removed affords access to the interior of the casing for inserting and removing the crank-shafts and for fastening the cap 51 to the support and removing it therefrom and for attaching the pitmen to the crank shafts and removing and repairing them.

Figure 4:
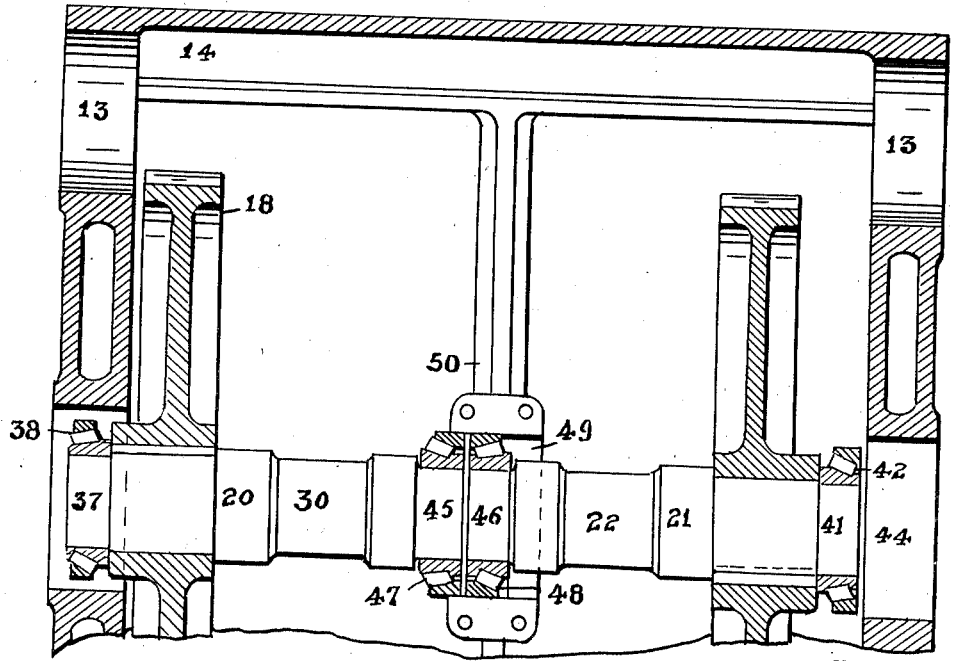

To assemble the parts, the cover 53 and the cap 51 having been removed, one of the crank shafts, as 20, is lowered into the casing with its antifriction bearings 38 and 47 thereon. The end 37 of the shaft is brought into line with the hole 40 and the end 45 over the recess 49. Then the crank-shaft is moved longitudinally to the left so that its end 37 and bearing 38 enter the hole 40 into which they are slid to the left beyond their final positions. In Fig. 4 the shaft 20 is shown slid to the left about as far as it can go before the gear 18 engages the side of the casing. In this position, the end 45 of the crank 20 rests in the recess 49, its right-hand terminal being to the left of the center of the recess, so that, when the shaft 21 is lowered into the casing, its end 41 may escape hitting the inner face of the casing and its inner end 46 may be lowered into the recess 49 in line with the end 45 of the shaft 20, as shown in Fig. 4. The parts being as in Fig. 4, the shafts 20 and 21 are moved longitudinally to the right so that the end 41 enters the hole 44 and the end 37 moves nearly an equal distance to the right.

The ends 45 and 46 are separated by the annular spacer 55 which engages the outer ring members of the bearings 47 and 48. The cup-shaped caps 39 and 43 are slid into the holes 40 and 44 and there receive the bearings 38 and 42, the caps being afterward secured to the casing by the screws 54. The cap 51 is placed over the bearings 47 and 48 and the spacer 55 and secured in place by the bolts 52.

The shaft 10 is readily moved longitudinally into place and the caps 12 are slid into the holes 13 to receive the bearings 11. The caps 12 are secured to the casing 14 by the screws 56.

Fig. 2 shows one of the cranks having a ninety degree angle of lead over the other. It may be desirable to change this angle which is readily done by removing the cap 12 nearest the gear 15, moving the shaft 10 endwise until the pinions are out of mesh with the gears 18 and 19, and then rotating one of the crank shafts so as to give one of the cranks the desired angle of lead, after which the shaft 10 and the cap 12 are restored to their normal places. Alternatively, one of the crank shafts might be moved so as to take its pinion out of mesh with the companion gear, and then rotated the desired angle. This could be done after removing the cap 51 and the pitman on the crank shaft to be moved. The parts could be moved to the position shown in Fig. 4, when it would be easy to lift the shaft 21 sufficiently to make its gear 19 escape from the pinion 17, whereupon the shaft 21 may be rotated as desired.

If the crank shafts 20 and 21 were integral, it would be well nigh impossible to make the two pinions 16 and 17 mesh with the two gears 18 and 19 so that the load will be equally distributed through both pairs of gears. With the two unit crank shafts as shown each crank is driven by the shaft 10 just as effectively as if the other were not present. The construction shown permits slight deviations from accuracies without disturbing the load conditions.

I claim—

1. In a pump, a casing having two holes in integral portions of its sides, a bearing support between the holes, two separate crank shafts, bearings in the holes to support the outer ends of the crank shafts, bearings carried by the said central support for supporting the inner ends of the crank shafts, a pitman actuated by each crank shaft, and a pump piston operated by each pitman, the inner ends of the shafts projecting sufficiently so that, when the inner end of either shaft is in the center support, the outer end thereof may be arranged in position to enter the adjacent hole in the casing.

2. In a pump, a casing having two holes in integral portions of its sides, a bearing support between the holes, two separate crank shafts, bearings in the holes to support the outer ends of the crank shafts, bearings carried by the said central support for supporting the inner ends of the crank shafts, a pitman actuated by each crank shaft, and a pump piston operated by each pitman, the inner ends of the shafts projecting sufficiently so that, when the inner end of either shaft is in the center support, the outer end thereof may be arranged in position to enter the adjacent hole in the casing and the outer ends of the said shafts projecting sufficiently so that the outer end of the said shaft may be moved outwardly into the said hole to allow the other shaft to have its inner end on the said center support while its outer end is arranged in position to enter the adjacent hole in the casing.

In testimony whereof I hereunto affix my signature.

JOHN A. YOUNG.